J. R. MANNERS.
FINGER EXERCISER.
APPLICATION FILED APR. 14, 1911.

1,027,871.

Patented May 28, 1912.

WITNESSES

INVENTOR
James R. Manners
BY Munn & Co.
ATTORNEYS

UNITED STATES PATENT OFFICE.

JAMES R. MANNERS, OF MANILA, PHILIPPINE ISLANDS.

FINGER-EXERCISER.

1,027,871.   Specification of Letters Patent.   Patented May 28, 1912.

Application filed April 14, 1911. Serial No. 621,040.

*To all whom it may concern:*

Be it known that I, JAMES R. MANNERS, a citizen of the United States, and at present residing at Fort William McKinley, Manila, Philippine Islands, have invented a new and useful Finger-Exerciser, of which the following is a full, clear, and exact description.

Pianists and typists in learning to use their respective instruments and machines in a facile and quick manner, are obliged to consume much time in drilling exercises in order to acquire perfect control of the individual fingers of both hands, this control being essential to success in the use of the device named. Other persons depend upon finger dexterity in obtaining profitable returns from the work in which they are engaged.

The object of my invention is to provide a simple device adapted to engage certain fingers of either hand and leaving any desired finger free, whereby that finger may be exercised in various ways depending on the calling of the person.

Another object of the invention is to provide a simple device of the class described, which shall consist of few parts and shall be pleasing in its appearance, while at the same time being effective as a means to produce the result desired, *i. e.*, the exercise of individual fingers in order to obtain control of each finger independently of the others.

In the accompanying sheet of drawings, in which similar characters of reference indicate corresponding parts in all the figures, I have set forth the preferred form of my invention and two modifications thereof; it is obvious, however that the device is capable of various modifications which would still embody the spirit of my invention.

Figure 1:
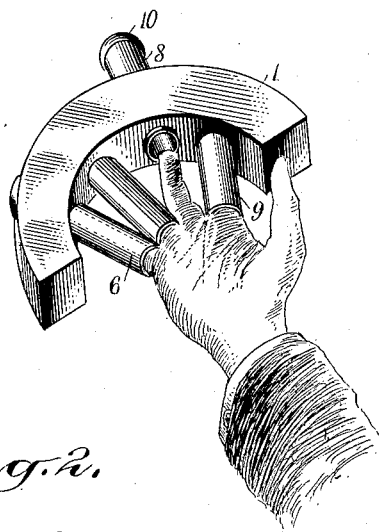
Figure 2:
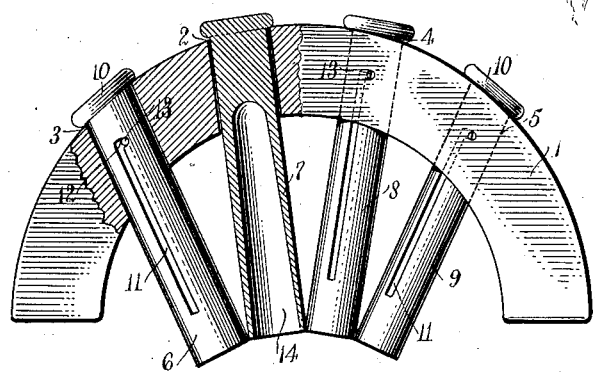
Figure 3:
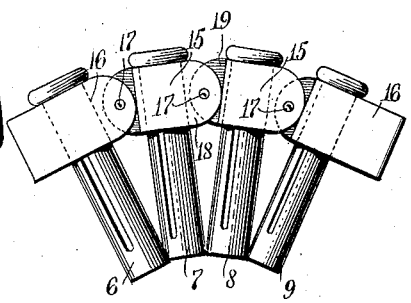
Figure 4:
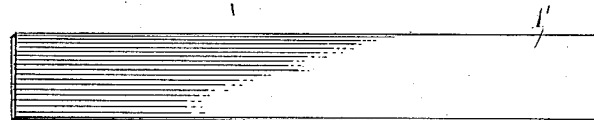
Figure 5:
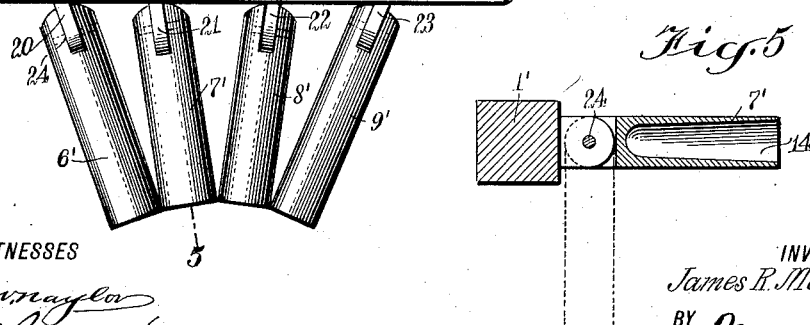

Figure 1 is a perspective view of my device engaged by the fingers of the right hand, the second finger being free; Fig. 2 is a view, partly in section, showing the relation of the various parts; Fig. 3 is one view of a modified form of base member; Fig. 4 is one view of a modified form having the base member and the finger stalls in pivoted engagement; and Fig. 5 is a sectional view on the line 5—5 of Fig. 4; the finger stall when in inoperative position is shown in dotted outline.

The base member 1, in Figs. 1 and 2, is preferably semi-circular in outline and may be described as semi-cylindrical. The width, length and thickness thereof may be of various dimensions, depending on the hand of the person using the device. The base member is provided with four longitudinal and preferably circular openings 2, 3, 4 and 5, the direction of each of which is toward a common point, and the distances between which are substantially equal. In each of these openings, a cylindrical member or finger stall 6, 7, 8 or 9 movably engages, each member being provided with a head 10, which abuts the base member save when one of them is withdrawn in order to leave one finger free. Each member is also provided with a longitudinally extending slot 11, having an offset 12 at one end, each slot being engaged by a pin 13, which extends through the base member 1 and into each of the openings therein. The pin and slot form a guiding means for each finger stall, and the pin and the offset at the end of each slot form a locking means, whereby each stall in held against movement out of the base portion when the pin is engaged in the offset as shown in Fig. 2.

Each of the movable cylindrical members or stalls is bored for a portion of its length, whereby the four of them may engage four fingers of either hand. As shown in Fig. 2, the bore 14 is preferably tapered so that each of the fingers may snugly engage in its stall. The different stalls will be bored differently, so that the fingers of either hand which are of unequal lengths and thickness, may be so engaged. It is also obvious that different exercisers of varying sizes of bored stalls may be provided, whereby fingers of different sizes may be accommodated. It is to be noted that the stalls extend radially and that the inner ends are closely adjacent, so that the fingers may enter freely without any strain.

The stalls may be made of any suitable material, as may also the base portion, and the stalls may be lined with some soft substance, if desired. The walls of the cylindrical members or finger stalls will preferably be as thin as possible, in order to engage the fingers when they are not unduly distended.

In Fig. 3, I have shown a modified form of base member. In this instance, each of the stalls 6, 7, 8, 9 is provided with a sliding piece 15 or 16, these pieces being pivotally connected together by pins 17. One end portion of each of these pieces is milled or slotted as at 18, and the other end portion is planed as at 19, whereby interengaging parts are secured through which the aforesaid pin 17 passes. Each of the stalls is provided with the slot and offset previously described, and the pin engaging therewith is also retained. It is obvious that this form is capable of use the same as the preferred form. There is some advantage in this particular form, due to the fact that the person using it may stretch the fingers far apart, if desired, because of the pivoted relation of the parts.

In Fig. 4, I have shown a still further modification. The base portion 1' is a rectangular member and is provided with the converging lugs 20, 21, 22, 23 on one face thereof, on which the finger stalls 6', 7', 8', and 9' are pivotally supported as at 24. The finger stalls in this instance are provided with the tapered bore but the pin and slot engagement is omitted. It is to be noted that the free ends of the stalls are closely adjacent and each one may be moved out of operative position by turning it on the pin 24 as shown in Fig. 5.

A person who desires to use my device will place any three of the four fingers of one hand in the appropriate stalls. The stall which is unengaged may be moved out of the way by sliding it out as in Figs. 1 or 3, or by turning it up or down as in Fig. 4. The disengaged finger may now be moved freely up and down while extended, or the middle joint may be turned and the finger may be exercised in this position. Various exercising movements may be gone through, some of which will suggest themselves to the user depending on the occupation he follows. The fingers engaged in the stalls may be tensed or relaxed as desired. When one finger has been suitably exercised, it is placed in its stall and another finger taken. The device may be used on the fingers of either hand, by simply turning it over. It is also obvious that all the fingers may be engaged in their stalls and the exerciser moved up and down with the knuckles or the wrist as a center, thereby providing for exercise of and control over the muscles of the hand and forearm.

From all of which, it follows that I have provided a simple and effective device, whereby the fingers may be separately exercised in order to acquire control over each of them.

While I have set forth some of the methods of exercise, other methods will suggest themselves to the users, so that the scope of employment of the device is wide.

What I claim as new and desire to secure by Letters Patent is:

1. In a device of the class described, a base member provided with finger stalls into which the fingers are adapted to extend, the stalls being movable bodily of the base member.

2. In a device of the class described, a base member provided with members adapted to engage the fingers of a person's hand, the said members being movable bodily and transversely of the base member.

3. A finger exerciser, comprising a base member, a plurality of finger stalls carried by the base member and movably mounted therein, and means for holding the finger stalls in the base member.

4. A finger exerciser, comprising a base member, and a plurality of members carried thereby and movable therein, the said members being provided with tapered openings, whereby any desired fingers of a person's hand may be engaged.

5. A finger exerciser comprising a base member, a number of finger stalls slidably supported thereon, the stalls extending in a radial direction, any one of the stalls being adapted to receive one of the fingers of a person's hand.

In testimony whereof I have signed my name to this specification in the presence of two subscribing witnesses.

JAMES R. MANNERS.

Witnesses:
 CHAS. A. MCDONOUGH,
 PERCY WARNER VINAN.